United States Patent
Nakamura

(10) Patent No.: US 10,356,220 B2
(45) Date of Patent: Jul. 16, 2019

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Shun Nakamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 15/473,319

(22) Filed: Mar. 29, 2017

(65) Prior Publication Data
US 2017/0289314 A1   Oct. 5, 2017

(30) Foreign Application Priority Data

Mar. 31, 2016 (JP) ................................ 2016-072593
Jan. 24, 2017 (JP) ................................ 2017-010751

(51) Int. Cl.
G06F 15/16 (2006.01)
H04L 29/06 (2006.01)
H04W 76/27 (2018.01)
H04L 29/08 (2006.01)
G06F 1/3209 (2019.01)
H04N 1/00 (2006.01)

(52) U.S. Cl.
CPC ............ H04L 67/42 (2013.01); G06F 1/3209 (2013.01); H04L 67/142 (2013.01); H04N 1/00204 (2013.01); H04N 1/00244 (2013.01); H04N 1/00896 (2013.01); H04W 76/27 (2018.02); H04N 2201/0094 (2013.01)

(58) Field of Classification Search
CPC .................................................. H04N 1/00896
See application file for complete search history.

(56) References Cited

U.S. PATENT DOCUMENTS

| 2005/0030582 | A1* | 2/2005 | Xu ...................... H04N 1/00209 358/1.15 |
| 2010/0100590 | A1* | 4/2010 | Palay .................... G06Q 10/107 709/203 |
| 2011/0182208 | A1* | 7/2011 | Shima ..................... G06F 1/266 370/254 |
| 2011/0292975 | A1 | 12/2011 | Kuwahara |
| 2012/0045201 | A1* | 2/2012 | Skubic ................. H04B 10/272 398/38 |
| 2012/0110110 | A1* | 5/2012 | Luna ....................... H04L 67/22 709/213 |
| 2012/0117401 | A1* | 5/2012 | Gobriel ................. G06F 1/3209 713/320 |
| 2014/0156725 | A1* | 6/2014 | Mandyam ............... H04L 67/02 709/203 |
| 2016/0278142 | A1* | 9/2016 | Babbage, II .......... H04W 76/12 |

FOREIGN PATENT DOCUMENTS

| JP | 2010283618 A | 12/2010 |
| WO | 2013024553 A1 | 2/2013 |

* cited by examiner

*Primary Examiner* — Douglas B Blair
(74) *Attorney, Agent, or Firm* — Canon U.S.A., Inc. IP Division

(57) ABSTRACT

A determination unit determines whether a server is an apparatus configured with an information processing apparatus in an integrated manner, and according to a result of the determination of the determination unit, a communication connection between the server and the information processing apparatus is controlled, and the transition of a power state is controlled.

18 Claims, 12 Drawing Sheets

INFORMATION PROCESSING APPARATUS, METHOD FOR CONTROLLING INFORMATION PROCESSING APPARATUS, AND STORAGE MEDIUM

BACKGROUND OF THE INVENTION

Field of the Invention

The present invention relates to a technique for sharing particular information between a server and a client.

Description of the Related Art

Conventionally, a synchronization system for sharing particular information between a server and a client is known. WO2013/024553 discusses a client (a mobile phone) for periodically transmitting a keep-alive packet to a server that provides a synchronization service regarding information of email, a calendar, or contact number and address, and performing synchronization communication with the server. If the display state of a display of the client changes from being displayed to being hidden, the client discussed in WO2013/024553 stops periodically transmitting a keep-alive packet to the server. Further, if the display state of an operation screen changes from being hidden to being displayed, the client discussed in WO2013/024553 resumes the transmission of a keep-alive packet to the server.

Further, the publication of Japanese Patent Application Laid-Open No. 2010-283618 discusses a synchronization system for sharing setting data of an image forming apparatus between a server and a client. Patent literature 2 discusses a configuration in which a single image forming apparatus has both a web server control unit for achieving the function of a server, and a web client control unit for achieving the function of a client.

In a system for periodically transmitting a predetermined packet to keep a communication connection between a server and a client as in WO2013/024553, if a single apparatus has both a server function and a client function as in Japanese Patent Application Laid-Open No. 2010-283618, the following problem arises. That is, the apparatus having both the server function and the client function cannot disconnect the communication connection between the server and the client.

For example, if the server does not receive a keep-alive packet by the time a predetermined time elapses after the server receives a previous keep-alive packet from the client, the server disconnects the connection with the client. Under the condition that connections with all clients as management targets are disconnected, the server can transition to a power saving state.

Further, if the apparatus satisfies a condition for transitioning to a power saving state, the client stops transmitting a keep-alive packet to the server and disconnects the connection with the server.

In this case, if a server unit for achieving the server function and a client unit for achieving the client function are configured as an integrated apparatus, this apparatus operates as follows.

That is, the client unit keeps a standby state until the apparatus including the client unit becomes able to transition to a power saving state. While being in the standby state, the client unit continues to periodically transmit a keep-alive packet to the server unit of the apparatus including the client unit.

On the other hand, since a keep-alive packet is periodically transmitted from the client unit, the server unit cannot disconnect the connection with the client unit and cannot cause the apparatus including the server unit to transition to a power saving state. Since the apparatus including the server unit cannot transition to a power saving state, the client unit continues to transmit a keep-alive packet to the server unit of the apparatus including the client unit.

As described above, the server unit and the client unit continue to keep the connection and cannot transition to a power saving state.

SUMMARY OF THE INVENTION

According to an aspect of the present invention, an information processing apparatus includes a memory device that stores a set of instructions, and at least one processor that executes the instructions to determine whether or not the information processing apparatus is an apparatus which requires, as a transition condition of the apparatus to a power saving state, that a server becomes able to transition to the power saving state, the server being for communicating with the information processing apparatus, and regarding keeping of a communication connection between the information processing apparatus and the server, perform different types of control between a case where it is determined that the information processing apparatus is the apparatus which requires, as the transition condition to the power saving state, that the server becomes able to transition to the power saving state, and a case where it is determined that the information processing apparatus is not the apparatus which requires, as the transition condition to the power saving state, that the server becomes able to transition to the power saving state.

Further features of the present invention will become apparent from the following description of exemplary embodiments with reference to the attached drawings.

DESCRIPTION OF THE EMBODIMENTS

With reference to the drawings, embodiments for carrying out the present invention will be described below.

Figure 1:
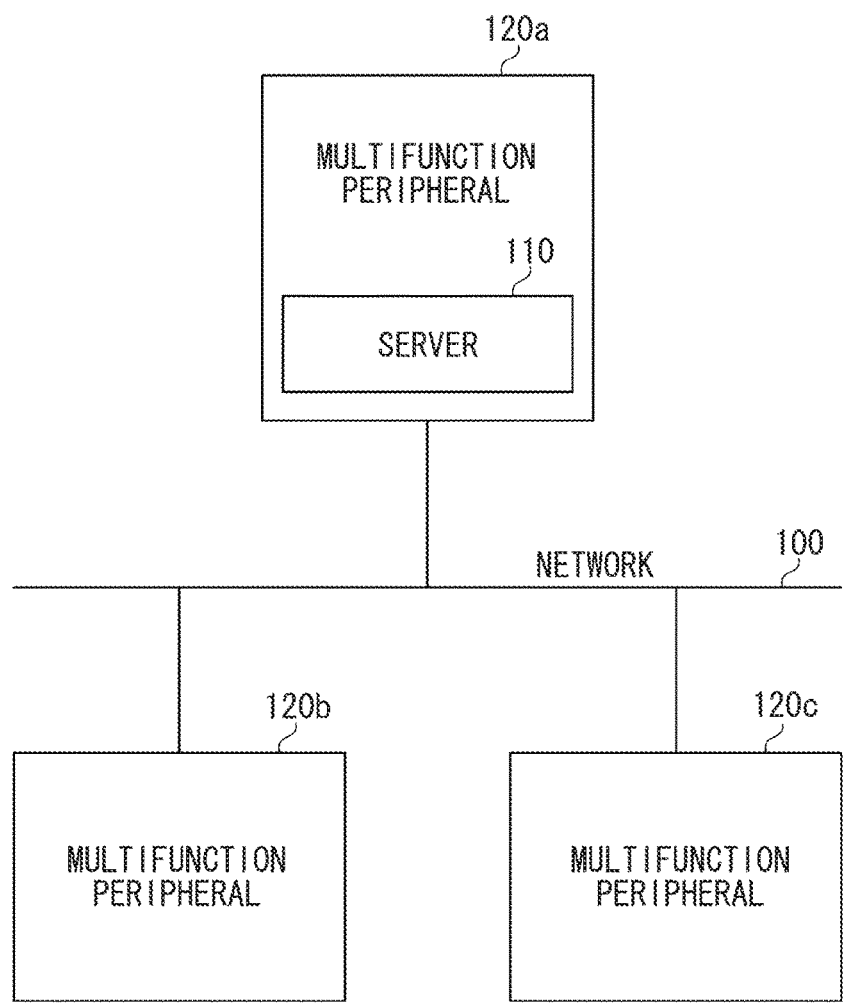
FIG. 1 is a diagram illustrating an example of a configuration of an information processing system according to a first exemplary embodiment.

FIG. 1 is a diagram illustrating the configuration of a setting value synchronization system according to a first exemplary embodiment. In an example of FIG. 1, multifunction peripherals 120a, 120b, and 120c as information processing apparatuses are connected to a network 100. A server 110 is present in the multifunction peripheral 120a. Hereinafter, each of the multifunction peripherals 120a, 120b, and 120c will simply be referred to as a "multifunction peripheral 120".

In the present exemplary embodiment, "synchronization" refers to the process of, in a case where one of master data 401, which is managed by the server 110, and setting data 311, which is managed by the multifunction peripheral 120, is updated, reflecting the content of the update also on the other so that the content is updated to a common value. In the present exemplary embodiment, setting information is transmitted in both directions between the server 110 and the multifunction peripheral 120. The present invention, however, is also applicable to a system where setting information is transmitted in only one such direction.

The server 110 manages master data 401 to manage a setting value of the multifunction peripheral 120. The master data 401 is setting information managed by the server 110. If the master data 401 is updated, the server 110 notifies the multifunction peripheral 120 of update information via the network 100. This update information is information indicating the content of the update of the master data 401. Further, if receiving update information of a setting value from the multifunction peripheral 120, the server 110 updates the value of the master data 401 using the received update information. In the present exemplary embodiment, the server 110 functions as a general Hypertext Transfer Protocol (HTTP) server and can use the keep-alive function of HTTP/1.1.

The multifunction peripheral 120 is an image forming apparatus for achieving a plurality of types of functions, such as a copy function and a fax function and stores therein setting data 311, which is used to execute these functions. Instead of the multifunction peripheral 120, an image forming apparatus having only a single function, such as a copy function, a fax function, or a scanner function may be used.

If the setting data 311, which is setting information managed by the multifunction peripheral 120 as a client, is updated, the multifunction peripheral 120 notifies the server 110 of update information (first update information) via the network 100. This update information is information indicating the content of the update of the setting data 311. Further, if acquiring update information (second update information) of the master data 401 from the server 110, the multifunction peripheral 120 as a client updates the content of the setting data 311, which is managed by the multifunction peripheral 120, using the acquired update information.

With the above configuration, the server 110 and the multifunction peripheral 120 perform a setting data synchronization process. To perform a notification process for notifying the server 110 of the first update information or an acquisition process for acquiring the second update information, the multifunction peripheral 120 performs the process of establishing a connection with the server 110. Then, using the established connection, the multifunction peripheral 120 notifies the server 110 of the first update information or acquires the second update information from the server 110.

Figure 2:
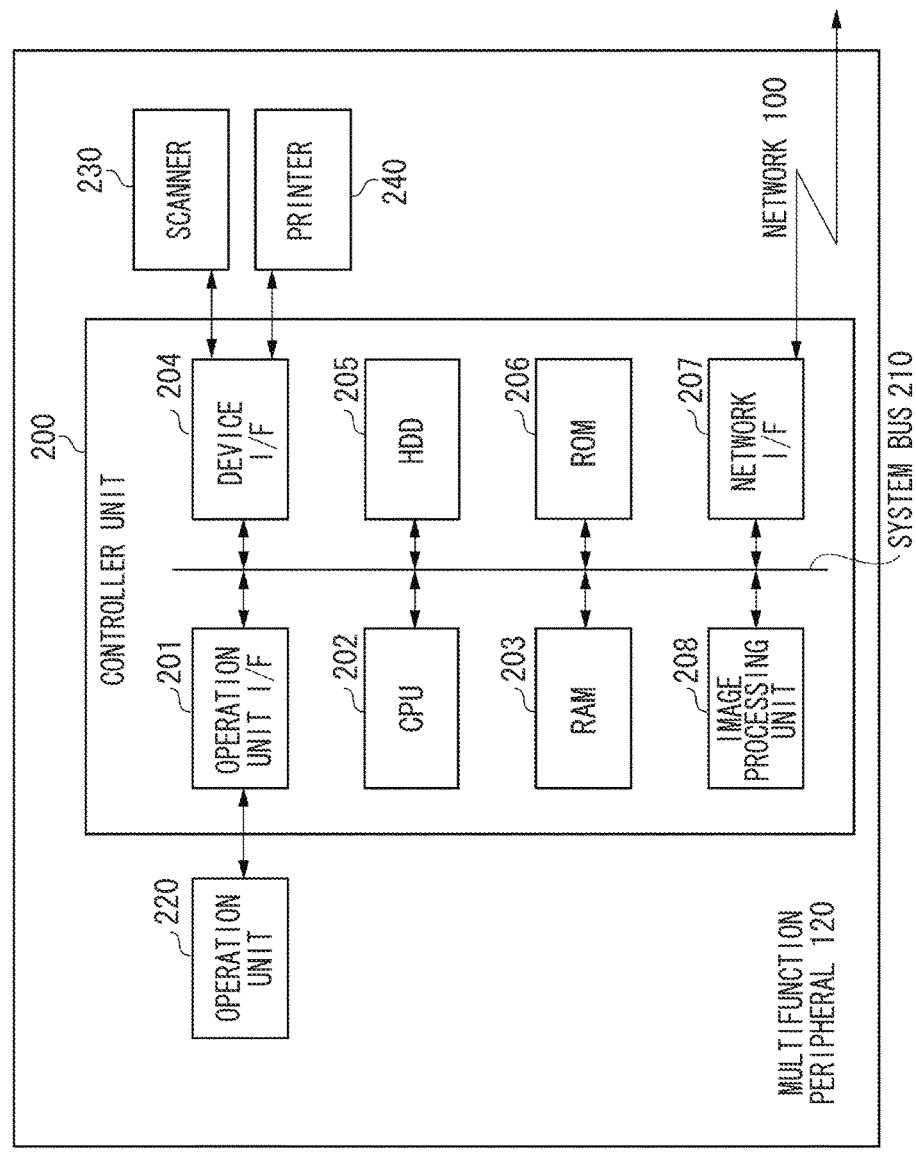
FIG. 2 is a diagram illustrating an example of a configuration of a multifunction peripheral.

FIG. 2 is a block diagram illustrating the configuration of the multifunction peripheral 120 according to the present exemplary embodiment. The multifunction peripheral 120 includes a controller unit 200, an operation unit 220, a scanner 230, and a printer 240. The controller unit 200 is connected to the operation unit 220. Further, the controller unit 200 is connected to the scanner 230, which is an image input device, and the printer 240, which is an image output device.

The controller unit 200 includes a central processing unit (CPU) 202. The CPU 202 executes a boot program stored in a read-only memory (ROM) 206 to activate an operation system (OS). The CPU 202 executes on the OS an application program stored in a hard disk drive (HDD) 205 to execute various types of processing. A random-access memory (RAM) 203 is used as a work area for the CPU 202. Further, the RAM 203 provides a work area and also provides an image memory area for temporarily storing image data. The HDD 205 stores the application program, image data, and various setting values.

The CPU 202 is connected to an operation unit interface (I/F) 201, a device I/F 204, a network I/F 207, and an image processing unit 208, together with the ROM 206 and the RAM 203, via a system bus 210. The operation unit I/F 201 is an interface with the operation unit 220, which includes a touch panel. The operation unit I/F 201 outputs, to the operation unit 220, image data to be displayed on the operation unit 220. Further, the operation unit I/F 201 transmits, to the CPU 202, information input by a user through the operation unit 220. The device I/F 204 is connected to the scanner 230 and the printer 240. The network I/F 207 is connected to the network 100, and inputs and outputs, via the network 100, information from and to apparatuses on the network 100. The image processing unit 208 performs processing on an image input from the scanner 230, processing on an image to be output to the printer 240, and processing, such as image rotation, image compression, resolution conversion, color space conversion, and gray scale conversion.

The ROM 206 or the HDD 205 stores a client application 300 and a server application 400. The CPU 202 of the multifunction peripheral 120 executes the client application 300 to achieve the function as a client of the server 110. Further, the CPU 202 of the multifunction peripheral 120 enables and executes the server application 400 to function also as the server 110. The user can change whether to enable the server application 400.

In the present exemplary embodiment, the server application 400 is enabled on the multifunction peripheral 120a. Further, the multifunction peripheral 120a executes also the client application 300. The multifunction peripheral 120a operates as the server 110 and operates also as a client of the server 110.

In the present exemplary embodiment, the multifunction peripherals 120b and 120c execute only the client application 300, and the server application 400 is disabled on the multifunction peripherals 120b and 120c. The multifunction peripherals 120b and 120c operate as clients of the server 110.

Figure 3:
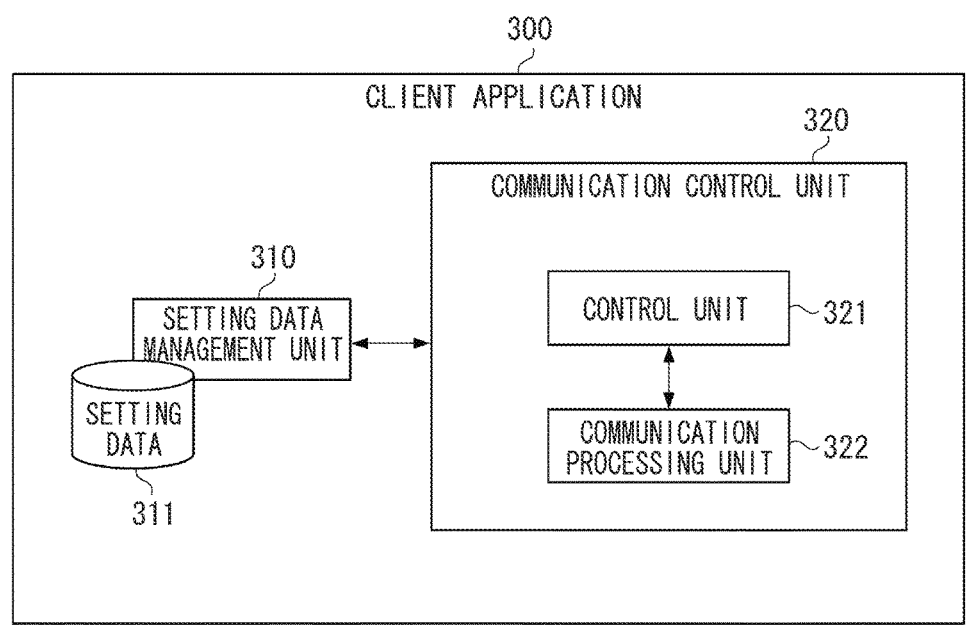
FIG. 3 is a diagram illustrating a module configuration of a client application.

Next, with reference to FIG. 3, a description is given of the configuration of the client application 300 for achieving the function of the multifunction peripheral 120 as a client. The client application 300 is held in a storage unit, such as the ROM 206 or the HDD 205, and is read and executed by the CPU 202.

With reference to FIG. 3, a description is given of the configuration of the client application 300, which is executed by the multifunction peripheral 120.

A setting data management unit 310 manages the setting data 311 of the multifunction peripheral 120. The setting data 311 includes various setting values to be used when the multifunction peripheral 120 operates as a client. The setting data 311 includes, for example, address book information and setting values customized for each user. The setting values customized for each user of the multifunction peripheral 120 include, for example, the setting values of the arrangement of buttons on an operation screen and a display language. The setting data 311 is stored in a storage unit, such as the HDD 205, the RAM 203, or the ROM 206.

If a communication control unit 320 acquires update information of the master data 401 from the server 110, the setting data management unit 310 performs control to reflect the acquired update information on the setting data 311. Further, if the setting data 311 is updated in the multifunction peripheral 120, the setting data management unit 310 causes the communication control unit 320 to execute the process of reflecting update information indicating the content of the update of the setting data 311 on the master data 401 of the server 110.

The communication control unit 320 controls the network I/F 207 and communicates with another apparatus. The communication control unit 320 includes a control unit 321 and a communication processing unit 322. The control unit 321 controls a setting value synchronization process with the server 110. The communication processing unit 322 controls a communication process via the network I/F 207. The communication processing unit 322 cooperates with a communication processing unit 422 to execute the process of establishing a communication connection (hereinafter, a "connection") between the server 110 and the information processing apparatus. For example, the communication control unit 320 can establish or release a connection according to the procedure of Transmission Control Protocol (TCP). The present invention, however, is not limited to this. Hereinafter, the process of establishing a connection will occasionally be referred to as "connecting a connection". The process of releasing a connection will occasionally be referred to as "disconnecting a connection". Further, in the present exemplary embodiment, a "connection" refers to a virtual communication channel established between the multifunction peripheral 120 and the server 110. Once a connection is established between the multifunction peripheral 120 and the server 110 by executing a predetermined communication procedure, the multifunction peripheral 120 and the server 110 can transmit and receive data to and from each other by a simple procedure in the subsequent communication.

The communication control unit 320 controls setting value synchronization communication with the server 110. Further, the control unit 321 receives update information of the master data 401 acquired from the server 110 by the communication processing unit 322. The control unit 321 requests the setting data management unit 310 to reflect the received update information of the master data 401 on the setting data 311. Further, the communication control unit 320 performs the process of determining whether the server 110 is placed in the multifunction peripheral 120 on which the communication control unit 320 is operating. That is, the communication control unit 320 determines whether the multifunction peripheral 120 on which the communication control unit 320 is operating is an apparatus configured with the server 110 in an integrated manner. In the present exemplary embodiment, if the multifunction peripheral 120 is an apparatus configured with the server 110 in an integrated manner, then the multifunction peripheral 120 determines that the multifunction peripheral 120 is an apparatus which requires, as a transition condition to a power saving state, that the server 110 becomes able to transition to the power saving state (a first determination). Further, in the present exemplary embodiment, if the server 110 and the multifunction peripheral 120 are different apparatuses, then the multifunction peripheral 120 determines that the multifunction peripheral 120 is not the apparatus which requires, as the transition condition to the power saving state, that the server becomes able to transition to the power saving state (a second determination). Regarding the maintenance of a communication connection between the information processing apparatus and the server 110, the multifunction peripheral 120 performs different types of control between a case where the first determination is made and a case where the second determination is made. An example of the determination process will be described below with reference to FIG. 5.

Figure 4:
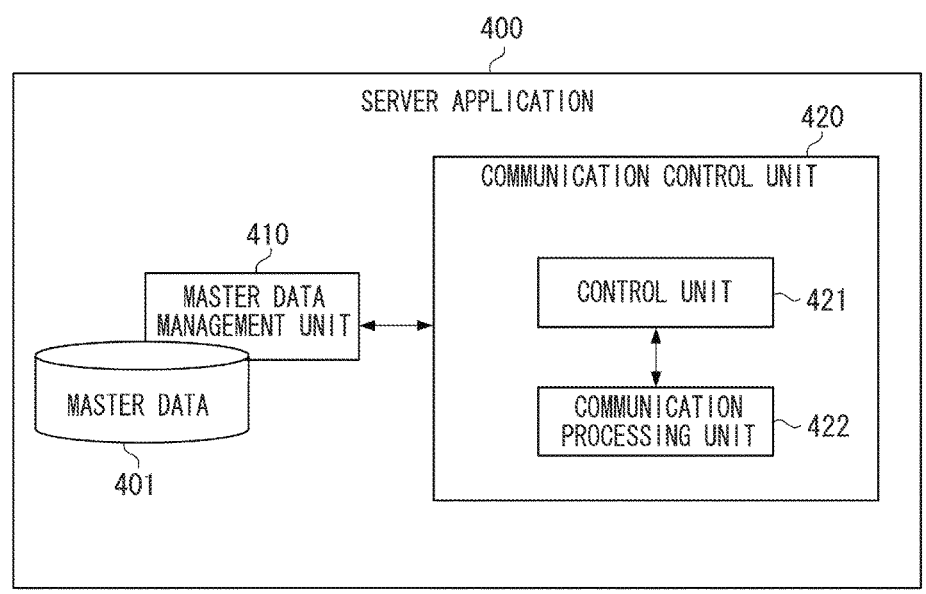
FIG. 4 is a diagram illustrating a module configuration of a server application.

Next, with reference to FIG. 4, a description is given of the configuration of the server application 400 for achieving the function of the server 110. The server application 400 is stored in a storage unit, such as the RAM 203, the HDD 205, or the ROM 206, and executed by the CPU 202. A master data management unit 410 manages the master data 401. According to an instruction from a communication control unit 420, the master data management unit 410 reads update information of the master data 401 or updates the master data 401.

The master data management unit 410 performs the process of reflecting, on the master data 401, update information received from the client application 300 by the communication control unit 420. Further, if the communication control unit 420 receives from the client application 300 a request to acquire update information of the master data 401, the master data management unit 410 performs the process of creating update information of the master data 401 and notifying the communication control unit 420 of the update information. The master data 401 managed by the master data management unit 410 is saved in a storage unit, such as the HDD 205, the RAM 203, or the ROM 206.

The communication control unit 420 controls communication via the network I/F 207. The communication control unit 420 includes a control unit 421 and a communication processing unit 422. The control unit 421 controls a setting value synchronization process with the client application 300. The communication processing unit 422 controls a communication process via the network I/F 207.

If the communication processing unit 422 receives update information of the setting data 311 from the client application 300, the control unit 421 notifies the master data management unit 410 of the received update information. Further, if the communication processing unit 422 receives from the client application 300 a request to acquire update information of the master data 401, the control unit 421 acquires update information of the master data 401 from the master data management unit 410. Then, the control unit 421 instructs the communication processing unit 422 to transmit the acquired update information to the client application 300.

The communication processing unit 422 executes a communication process with the client application 300. The communication processing unit 422 cooperates with the communication processing unit 322 to execute the process of establishing a communication connection between the server 110 and the information processing apparatus. For example, the communication processing unit 422 establishes or releases a connection with the multifunction peripheral 120 according to a predetermined procedure prescribed by TCP.

A description is given of the relationship between the maintenance of a communication connection between the server 110 and the multifunction peripheral 120, and a transition process in which the server 110 and the multifunction peripheral 120 transition to a power saving state, according to the present exemplary embodiment.

If the server 110 does not receive, from the multifunction peripheral 120 as a client, a notification requesting the server 110 to keep (maintain) the connection, the server 110 disconnects the connection with the multifunction peripheral 120. The notification requesting the server 110 to keep the connection is a notification requesting the server 110 to perform keep-alive communication which is described below. In a case where the multifunction peripheral 120 operates as the server 110, then under the condition that connections with all the multifunction peripherals 120 as management targets are disconnected, the multifunction peripheral 120 determines that the multifunction peripheral 120 can transition to a power saving state.

Further, if a condition for an apparatus to transition to a power saving state is satisfied, the multifunction peripheral 120 as a client stops transmitting a notification requesting the server 110 to keep the connection and releases the connection with the server 110. Examples of the condition for an apparatus to transition to a power saving state include the condition that a predetermined process is not executed for a predetermined period in the multifunction peripheral 120. Examples of the predetermined process include a printing process, a scanning process, and a fax process. Further, in the present exemplary embodiment, also if the server 110 configured with the multifunction peripheral 120 in an integrated manner keeps a connection with at least one multifunction peripheral 120, it is determined that the predetermined process is executed. The at least one multifunction peripheral 120 includes also the multifunction peripheral 120 as a client configured as an apparatus integrated with the server 110.

For example, in a case where the server function is not enabled on the multifunction peripheral 120, and if a predetermined time elapses in the state where no job is being executed or on standby, and no operation is received, the multifunction peripheral 120 transitions to a power saving state, regardless of whether a connection with the server 110 is being kept.

Further, for example, in a case where the multifunction peripheral 120 is operating also as the server 110, the multifunction peripheral 120 transitions to a power saving state under the following condition. That is, if a predetermined time elapses in the state where no job is being executed or on standby, and no operation is received, and also if the server 110 does not keep a connection with another multifunction peripheral 120, the multifunction peripheral 120 transitions to a power saving state.

Figure 5:
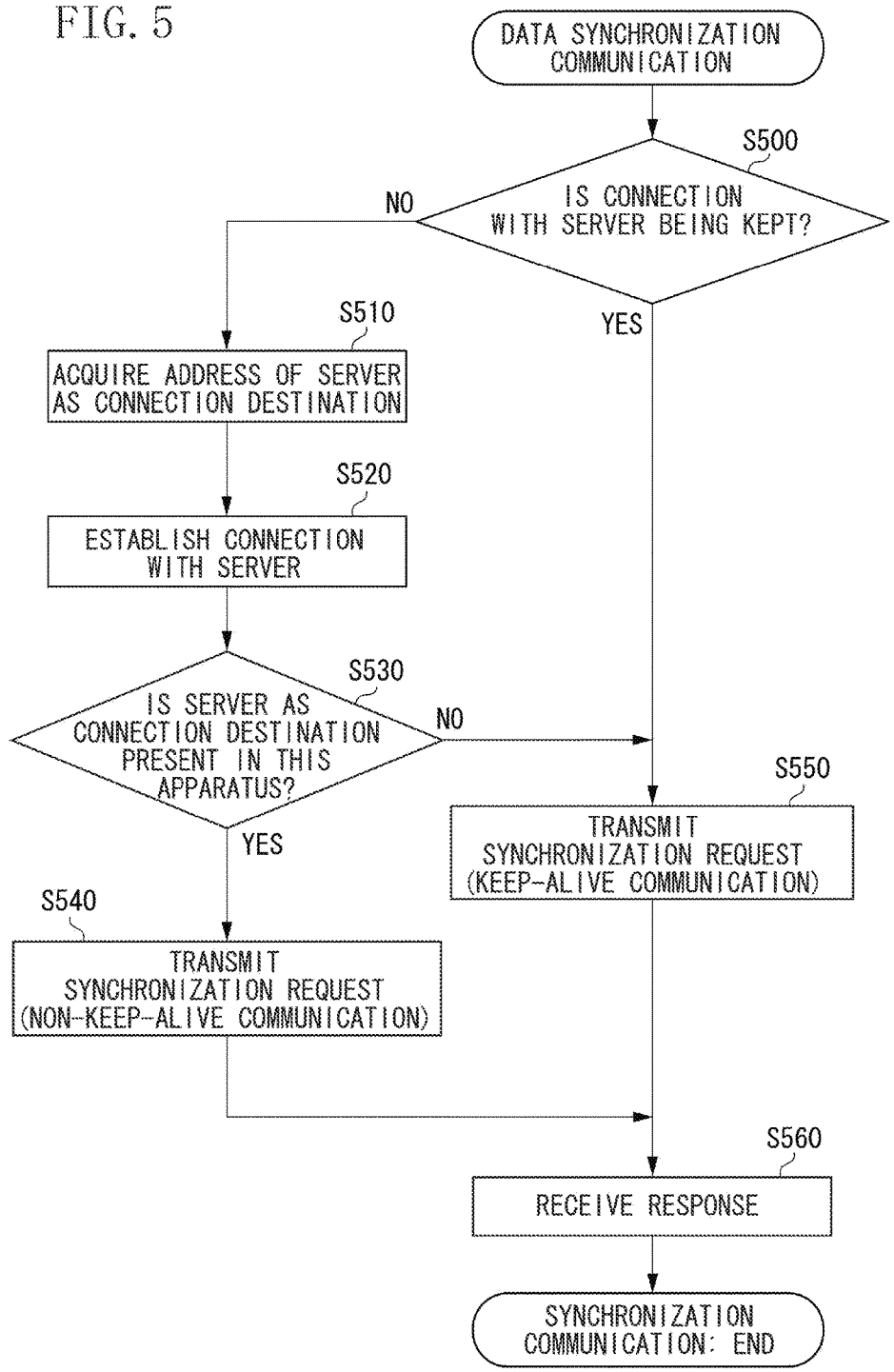
FIG. 5 is a flowchart illustrating processing performed by the client application according to the first exemplary embodiment.

Next, with reference to FIG. 5, the operation of the multifunction peripheral 120 as a client is described. The processing illustrated in FIG. 5 is achieved by the CPU 202 executing the client application 300 read from the HDD 205 or the ROM 206.

A flowchart in FIG. 5 is started in a case where a predetermined synchronization start condition is satisfied in the multifunction peripheral 120. The synchronization start condition is satisfied, for example, in a case where the client application 300 requests the server application 400 to acquire setting information (e.g., update information) of the master data 401. Further, the synchronization start condition is satisfied, for example, in a case where the setting data 311 is updated in the multifunction peripheral 120. The flowchart may be started at any other timing for synchronizing a setting value between the multifunction peripheral 120 and the server 110, and the content of the condition does not matter.

First, in step S500, the control unit 321 determines whether a connection with the server 110 is being kept. In a case where it is determined that a connection with the server 110 is being kept (YES in step S500), the processing proceeds to step S550. On the other hand, in a case where it is determined that a connection with the server 110 is not kept (NO in step S500), the processing proceeds to step S510. Although the determination in step S500 can be made according to, for example, a connection management method using the mechanism of keep-alive in HTTP, the determination method is not particularly limited.

In step S510, the control unit 321 reads address information of the server 110. This address information is a communication address to be used by the client application 300 to communicate with the server application 400. The address information of the server 110 to which the multifunction peripheral 120 is to connect is registered in advance in the multifunction peripheral 120 by an administrator, for example. In the present exemplary embodiment, the address information of the server 110 to which the multifunction peripheral 120 is to connect is managed as a part of the setting data 311 by the client application 300.

Next, in step S520, using the address information acquired in step 3510, the control unit 321 performs control to establish a connection with the server application 400 of the server 110. The control unit 321 controls the communication processing unit 322 to execute the process of establishing a connection with the server application 400.

Next, in step S530, the control unit 321 determines whether the server application 400 is enabled on the same apparatus as the multifunction peripheral 120 executing the client application 300. Based on the address information of the server 110 acquired in step S510, the control unit 321 performs the determination process in step S530.

For example, if a predetermined value "localhost" is set as the address information of the server 110, the control unit 321 determines that the server application 400 is enabled on the same apparatus as the multifunction peripheral 120. Further, for example, if a predetermined value, such as a local loopback address, is set as the address information of the server 110, the control unit 321 determines that the server application 400 is enabled on the same apparatus as the multifunction peripheral 120. As the local loopback address, for example, "127.0.0.1", "::1", or "OnThisDevice" can be used. If, on the other hand, the address information of the server 110 is not a predetermined value, the control unit 321 determines that the server 110 is configured as an apparatus different from the multifunction peripheral 120.

Alternatively, for example, the determination in step S530 may be made by comparing the Internet Protocol (IP) address of the multifunction peripheral 120 managed by the client application 300 of the multifunction peripheral 120 with the IP address of the server 110 acquired in step S510. If the IP addresses match each other, the control unit 321 determines that the server application 400 is enabled on the same apparatus as the multifunction peripheral 120. If, on the other hand, the IP addresses do not match each other, the control unit 321 determines that the server application 400 is executed by an apparatus different from the multifunction peripheral 120.

Yet alternatively, for example, when the multifunction peripheral 120 enables the server function of the server application 400 of the multifunction peripheral 120 itself, the multifunction peripheral 120 may store, in a predetermined storage area, information indicating that the server function is enabled (e.g., a server function enabling flag is on). The control unit 321 may make the determination in step S530 by determining whether information indicating that the server function of the multifunction peripheral 120 on which the control unit 321 is operating is enabled is stored in the predetermined storage area.

In a case where it is determined in step S530 that the server 110 is configured as the same apparatus as the multifunction peripheral 120 (YES in step S530), the processing proceeds to step 3540. That is, according to the fact that the result of the determination indicates that the server application 400 is enabled on the same apparatus as the multifunction peripheral 120, the processing proceeds to step S540. Further, according to the fact that the result of the determination in step S530 indicates that the server 110 is configured as an apparatus different from the multifunction peripheral 120 (NO in step S530), the processing proceeds to step S550.

In the present exemplary embodiment, in a case where the flow in FIG. 5 is performed as the processing of the multifunction peripheral 120a on which the function of the server 110 is enabled, it is determined in step S530 that the server 110 is configured as the same apparatus as the multifunction peripheral 120. On the other hand, in a case where the flow in FIG. 5 is performed as the processing of the multifunction peripheral 120b or 120c on which the function of the server 110 is not enabled, it is determined in step S530 that the server 110 is configured as an apparatus different from the multifunction peripheral 120. The same applies to a case where the multifunction peripheral 120b or 120c does not have the function of the server 110 (the server application 400).

In step S540, the control unit 321 controls the communication processing unit 322 to transmit a synchronization request to the server application 400. The synchronization request transmitted in step S540 includes information indicating that after synchronization communication ends, the connection with the server application 400 will be released.

This synchronization communication includes a communication process for transmitting to the server application 400 a request to acquire update information indicating the content of an update of the master data 401, and in response to the request, acquiring update information from the server application 400. Further, this synchronization communication includes a communication process for transmitting, to the server application 400, update information indicating the content of an update of the setting data 311 managed by the client application 300.

Further, the information indicating that after synchronization communication ends, the connection with the server application 400 will be released is, for example, "close", which is the value of a "Connection" field in a request header of a packet for performing HTTP communication. Consequently, it is possible to notify the server 110 of, together with the synchronization request, information for causing the server 110 to release the connection. Hereinafter, communication in which the connection with the server application 400 is released after synchronization communication ends will be referred to as "non-keep-alive communication".

As described above, according to the determination that the multifunction peripheral 120 is an apparatus configured with the server 110 in an integrated manner, then in step S540, the control unit 321 notifies the server 110 of information for causing the server 110 to release the connection. The process of step S540 is executed, so that it is possible to cause the server 110 to release the connection established between the server 110 and the multifunction peripheral 120. If connections with all the multifunction peripherals 120 are released, the server 110 becomes able to transition to a power saving state. As described above, at least one or more conditions required to become able to transition to a power saving state is satisfied.

Also in step S550, the control unit 321 controls the communication processing unit 322 to transmit a synchronization request to the server application 400. The synchronization request transmitted in step S550, however, does not include information indicating that after synchronization communication ends, the connection with the server application 400 will be released. The synchronization request transmitted in step S550 may include information indicating that the communication connection between the client application 300 and the server application 400 will be kept for a predetermined time. For example, the control unit 321 can specify "keep-alive" as the value of a "Connection" field in a request header for HTTP communication and notify the server 110 of the synchronization request. Consequently, it is possible to transmit, together with the synchronization request to the server 110, information for causing the server 110 to keep the connection. Hereinafter, communication in which the connection with the server application 400 is kept even if synchronization communication ends will be referred to as "keep-alive communication".

As described above, according to the determination that the multifunction peripheral 120 is an apparatus different from that of the server 110, then in step S550, the control unit 321 controls the multifunction peripheral 120 to notify the server 110 of information for causing the server 110 to keep the established connection.

In the processes of steps S540 and S550, the server application 400 may only need to determine whether to keep the connection with the server application 400 after synchronization communication ends. For example, in step S550, information indicating that the communication connection with the server application 400 will be kept for the predetermined time may be included and in step S540, information for causing the server 110 to release the connection with the server application 400 may not be transmitted.

In step S560, the control unit 321 receives a response to the synchronization request via the communication processing unit 322. The received information is, for example, a response indicating that the update information transmitted from the client application 300 to the server application 400 is properly received by the server application 400. Alternatively, the received information is update information of the master data 401 as a response to the request transmitted from the client application 300 to acquire update information.

Figure 6:
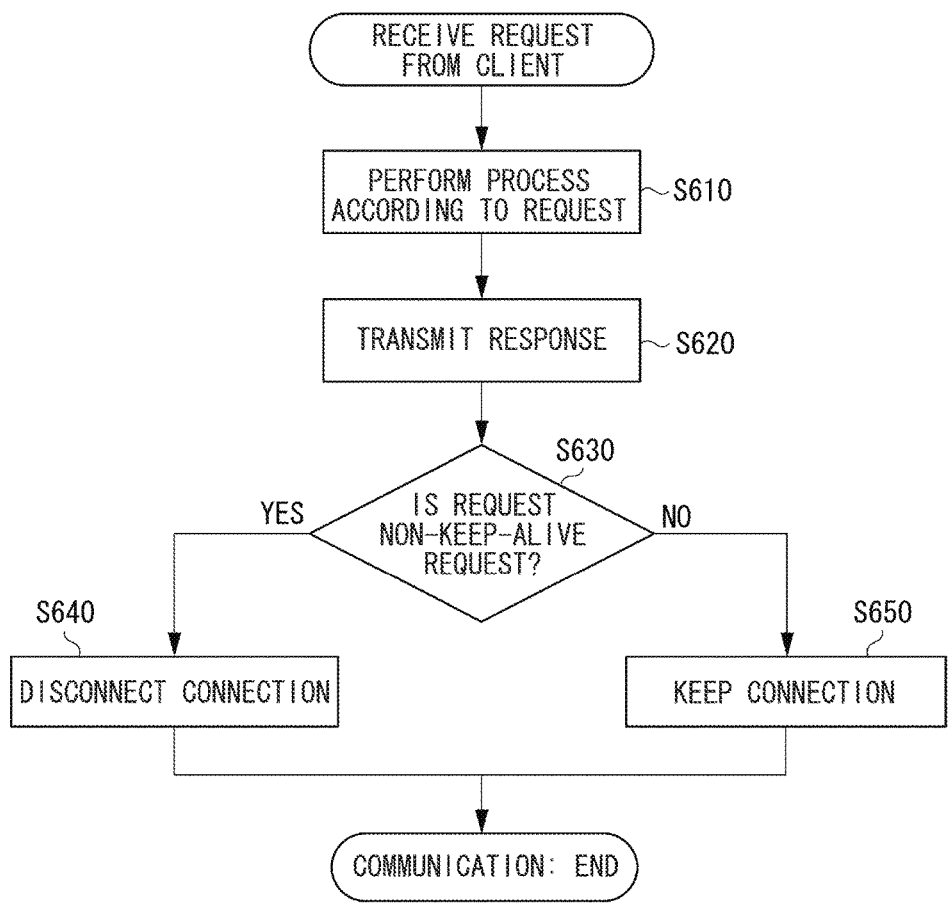
FIG. 6 is a flowchart illustrating processing performed by the server application according to the first exemplary embodiment.

Next, with reference to FIG. 6, the operation of the multifunction peripheral 120 as the server 110 is described. The processing illustrated in FIG. 6 is achieved by the CPU 202 executing the server application 400 read from the HDD 205 or the ROM 206. The processing in FIG. 6 is started when the server application 400 receives a synchronization request from the client application 300.

In step S610, the control unit 421 executes a process according to the synchronization request received via the communication processing unit 422. The process according to the synchronization request is, for example, the process of reflecting, on the master data 401, update information received from the client application 300. Alternatively, the process according to the synchronization request is, for example, the process of generating update information of the master data 401 in response to an acquisition request received from the client application 300. The control unit 421 controls the master data management unit 410 to execute these processes.

In step S620, the control unit 421 transmits a response to the synchronization request to the client application 300 via the communication processing unit 422. This response is, for example, information indicating that the update information received from the client application 300 is reflected on the master data 401. Alternatively, this response is, for example, the transmission of the update information of the master data 401 generated in step S610.

In step S630, the control unit 421 determines whether the synchronization request received from the client application 300 is a request for non-keep-alive communication. For example, the control unit 421 acquires the value of a "Connection" field in an HTTP header of the synchronization request, and based on this value, determines whether the setting value synchronization request is a request for non-keep-alive communication. In a case where the value of the "Connection" field is "close", it is determined that the setting value synchronization request is a request for non-keep-alive communication (YES in step S630), and the processing proceeds to step S640. In a case where the value of the "Connection" field is a value other than "close", or a "Connection" field is not present, it is determined that the setting value synchronization request is not a request for non-keep-alive communication (NO in step S630), and the processing proceeds to step S650.

In step S640, the control unit 421 instructs the communication processing unit 422 to perform the process of releasing a connection established between the client application 300 and the server application 400. Upon receipt of this instruction, the communication processing unit 422 executes the process of releasing the corresponding connection, and the flow illustrated in FIG. 6 ends.

In step S650, the control unit 421 keeps the connection established between the client application 300 and the server application 400, and the flow illustrated in FIG. 6 ends.

According to such a configuration, even in a case where an information processing apparatus has both a server function and a client function, it is possible to release a communication connection between a server and a client. Further, even in a case where an information processing apparatus has both a server function and a client function, it is possible to release a communication connection and transition to a power saving state.

That is, every time a synchronization communication ends, the multifunction peripheral 120a as a client configured with the server 110 in an integrated manner releases a connection with the server 110. Further, in a case where a condition for transitioning to a power saving state is satisfied in each of the multifunction peripherals 120b and 120c, the multifunction peripheral 120b or 120c releases a connection with the server 110. Consequently, it is possible to achieve the state where the server 110 does not establish a connection with any of the multifunction peripherals 120a, 120b, and 120c as clients managed by the server 110.

In a case where the server 110 does not establish a connection with any of the multifunction peripherals 120a, 120b, and 120c, then as described above, the multifunction peripheral 120a configured as an apparatus integrated with the server 110 can transition to a power saving state.

Consequently, it is possible to solve the issue of the conventional art that a connection with a client configured as an apparatus integrated with a server cannot be disconnected, and the server and the client configured as an integrated apparatus cannot transition to a power saving state. Thus, it is possible to construct a synchronization system that can be operated with less power.

Further, according to the above exemplary embodiment, the multifunction peripherals 120b and 120c that are not configured as an apparatus integrated with the server 110 can perform keep-alive communication with the server 110. Thus, from the second transmission of a synchronization request onward, it is not necessary to establish a connection with the server 110 every time a synchronization request is made. Thus, it is possible to quickly execute a synchronization process.

In the first exemplary embodiment, in a case where the server application 400 is enabled on the same apparatus as the multifunction peripheral 120 executing the client application 300, the client application 300 requests non-keep-alive synchronization communication. In a second exemplary embodiment, an example is described where even if the server application 400 is enabled on the same apparatus as the multifunction peripheral 120, whether to request non-keep-alive synchronization communication or keep-alive synchronization communication is switched according to the type of the operation as a trigger for transmitting a synchronization request. Examples of the type of the operation as a trigger for transmitting a synchronization request include a polling process or a predetermined process executed by the user for changing a setting of the multifunction peripheral 120. The description is given on the assumption that if an operation as a trigger for transmitting a synchronization request is executed, the above synchronization start condition is satisfied.

In the configuration according to the present exemplary embodiment, portions similar to those of the first exemplary embodiment are not described, and only portions different from those of the first exemplary embodiment are described here.

In the present exemplary embodiment, the communication processing unit 322 of the client application 300 makes a synchronization request to the server application 400 at predetermined time intervals. This synchronization request is a request to acquire update information of the master data 401. The update information of the master data 401 is information indicating the content of an update of the master data 401 performed after the time when the client application 300 previously receives setting information (e.g., update information) of the master data 401. The communication processing unit 322 transmits to the server application 400 a synchronization request including identification information of the client application 300 and time information indicating the time when the setting information of the master data 401 is previously acquired. In the following description, the process of sequentially transmitting a request to acquire update information of the master data 401 is referred to as a "polling process", and particularly, the process of transmitting an acquisition request at predetermined time intervals is referred to as a "regular polling process". In the present exemplary embodiment, an example is described where the client application 300 executes the regular polling process. Alternatively, the client application 300 may perform a polling process not at regular intervals.

Further, in the present exemplary embodiment, according to the execution of a login process of the user in the multifunction peripheral 120, the communication processing unit 322 transmits a request to acquire update information of the master data 401. Further, if the user operates the operation unit 220 to update a setting (the setting data 311) of the multifunction peripheral 120, the communication processing unit 322 transmits update information indicating the content of the update to the server application 400. The transmission of this update information corresponds to a synchronization request requesting the server application 400 to update the master data 401 using the update information.

Figure 7:
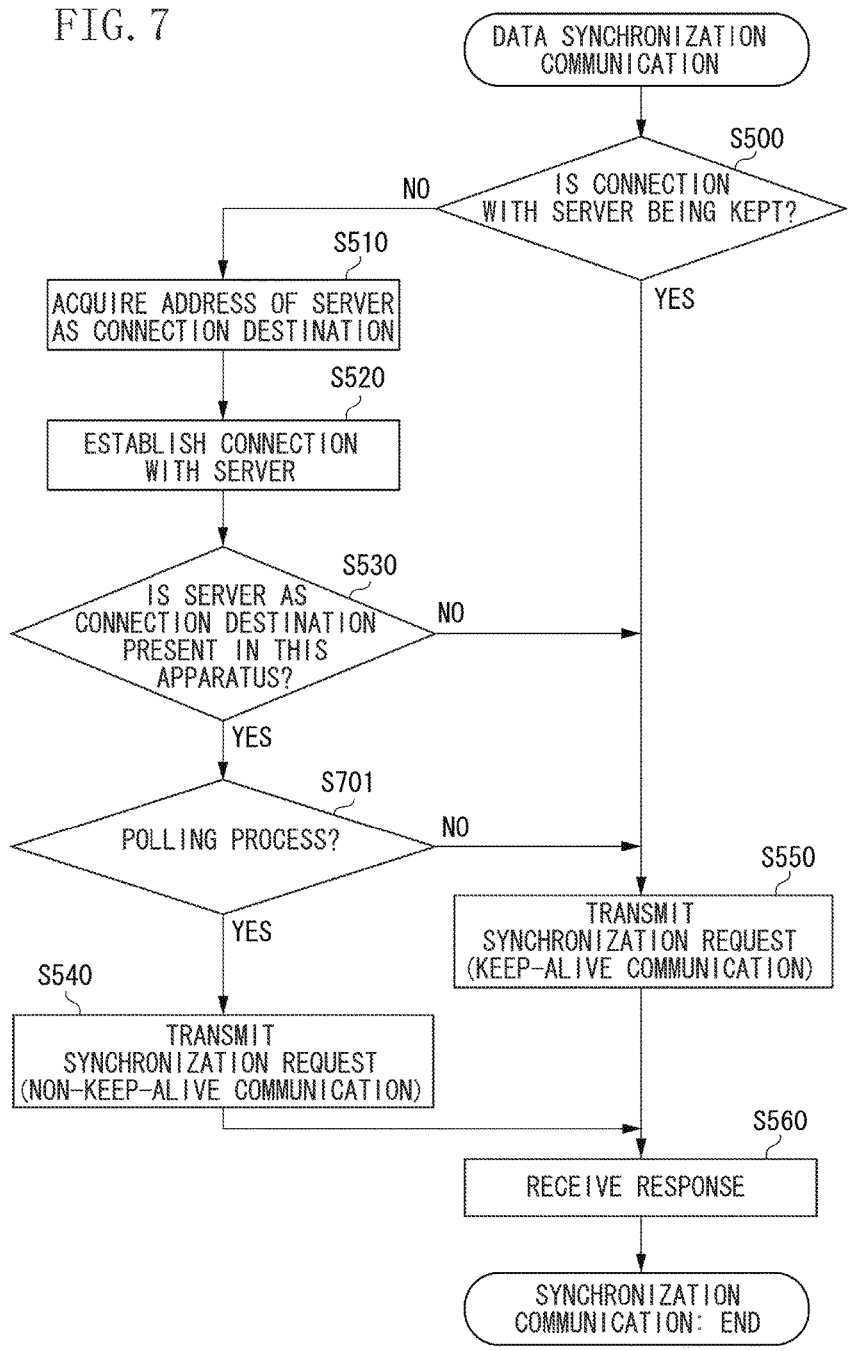
FIG. 7 is a flowchart illustrating processing performed by a client application according to a second exemplary embodiment.

With reference to FIG. 7, the operation of the client application 300 according to the present exemplary embodiment is described. The processing illustrated in FIG. 7 is achieved by the CPU 202 executing the client application 300 read from the HDD 205 or the ROM 206. The processes described with reference to FIG. 5 in the first exemplary embodiment are designated by the same step numbers as those in FIG. 5 and are not described here.

Similarly to FIG. 5, a flowchart illustrated in FIG. 7 is started in a case where a predetermined synchronization start condition is satisfied. The synchronization start condition is satisfied, for example, in a case where the client application 300 requests the server application 400 to acquire setting information (e.g., update information) of the master data 401. Further, the synchronization start condition is satisfied, for example, in a case where the setting data 311 is updated in the multifunction peripheral 120. The flowchart may be started at any other timing for synchronizing a setting value between the multifunction peripheral 120 and the server 110, and the content of the condition does not matter.

If it is determined in step S530 that the server 110 as the connection destination is present in the multifunction peripheral 120 on which the control unit 321 is operating (YES in step S530), the processing proceeds to step 3701.

In step S701, the control unit 321 determines whether the type of the operation as a trigger for starting the processing illustrated in FIG. 7 is a polling process. In a case where, as a result of the determination, the type of the operation is a polling process (YES in step S701), the processing proceeds to step S540. In a case where, on the other hand, the type of the operation is not a polling process (NO in step S701), the processing proceeds to step S550. The contents of the other processes are similar to those described with reference to FIG. 5.

In the above procedure, in a case where it is determined that the process executed by the multifunction peripheral 120 is a notification process for notifying the server 110 of update information, and also in a case where it is determined that the multifunction peripheral 120 is an apparatus configured with the server 110 in an integrated manner, the multifunction peripheral 120 notifies the server 110 of information for causing the server 110 to keep the connection. Further, in a case where it is determined that the process executed by the multifunction peripheral 120 is an acquisition process for acquiring update information, and also in a case where it is determined that the multifunction peripheral 120 is an apparatus configured with the server 110 in an integrated manner, the multifunction peripheral 120 notifies the server 110 of information for causing the server 110 to release the connection.

Processing is executed by such a procedure, so that in the situation where only a communication process to be executed in the background of the multifunction peripheral 120, such as a polling process, is executed, the connection with the server application 400 is released. Thus, for a reason similar to that described in the first exemplary embodiment, the multifunction peripheral 120 can transition to a power saving state.

Further, in the present exemplary embodiment, even in a case where the multifunction peripheral 120 as a client and the server 110 are configured as an integrated apparatus, the connection is kept if the start of the synchronization process is triggered by a user operation on the multifunction peripheral 120. The maintenance of the connection eliminates the need to construct a connection with the server 110 every time a single synchronization process is executed. Thus, it is possible to quickly execute the synchronization process.

According to the present exemplary embodiment, even in a case where the multifunction peripheral 120 as a client and the server 110 are configured as an integrated apparatus, it is possible to quickly execute the synchronization process if a synchronization process is started according to a user operation on the multifunction peripheral 120. Thus, the user can quickly proceed with the operation. This can improve the convenience for the user.

In a third exemplary embodiment, even if the server 110 receives a request for keep-alive communication from the client application 300, the server 110 releases the connection if the request is from a client application 300 operating on the multifunction peripheral 120 on which the server 110 is operating. Also with such a configuration, similarly to the first exemplary embodiment, the multifunction peripheral 120a configured as an apparatus integrated with the server 110 can transition to a power saving state.

In the configuration according to the present exemplary embodiment, portions similar to those of the first exemplary embodiment are not described, and only portions different from those of the first exemplary embodiment are described here.

The control unit 421 of the server application 400, which has been described with reference to FIG. 4, performs the process of determining whether a client application 300 making a synchronization request is a client application 300 operating on the multifunction peripheral 120 on which the control unit 421 is operating.

Figure 8:
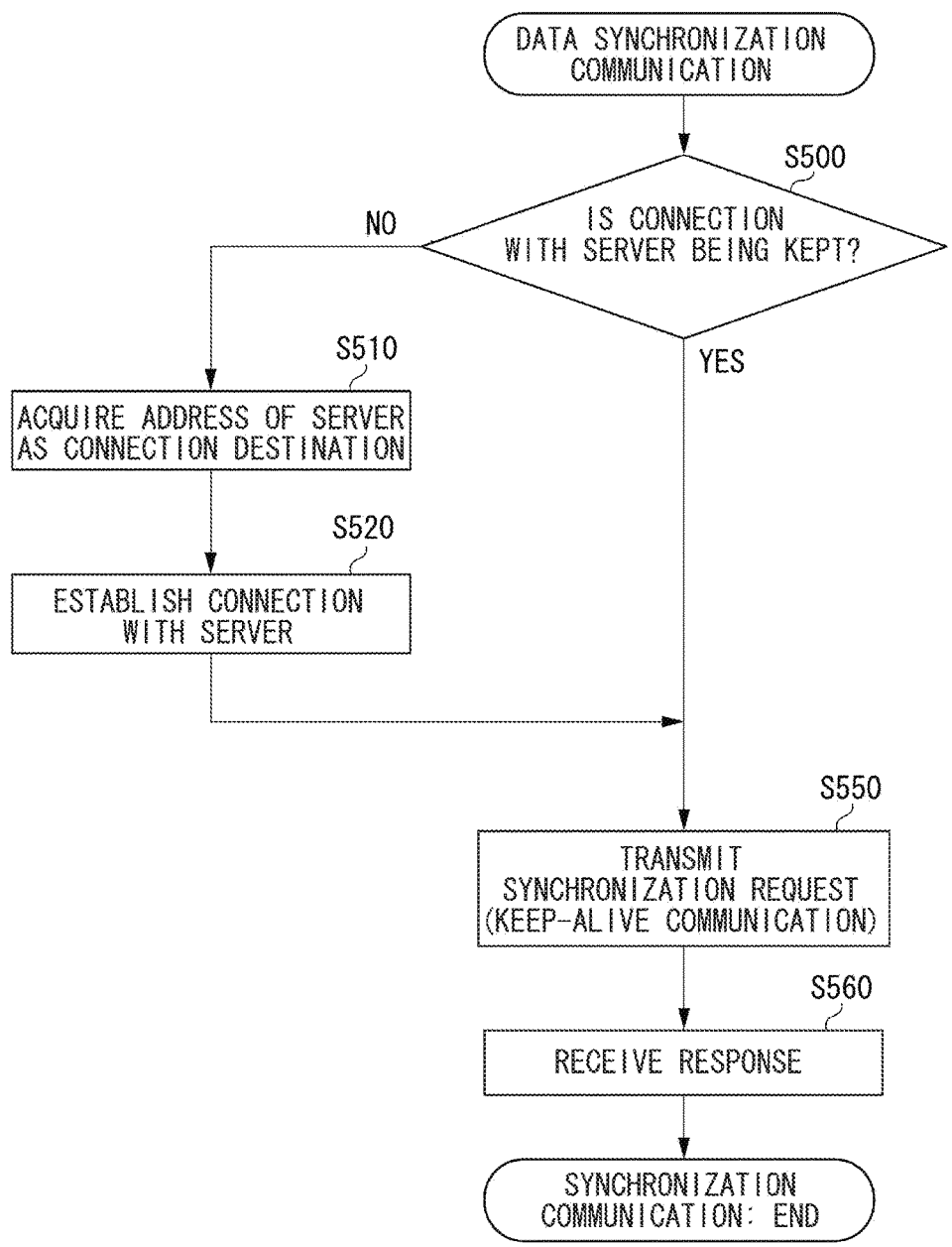
FIG. 8 is a flowchart illustrating processing performed by a client application according to a third exemplary embodiment.

With reference to FIG. 8, a description is given of the procedure of a communication process performed by the client application 300 of the multifunction peripheral 120 according to the present exemplary embodiment. The processing illustrated in FIG. 8 is achieved by the CPU 202 executing the client application 300 read from the HDD 205 or the ROM 206. In the following description, processes similar to those described with reference to FIG. 5 in the first exemplary embodiment are designated by the same step numbers as those in FIG. 5.

The processing of the multifunction peripheral 120 according to the present exemplary embodiment is different from that described with reference to FIG. 5 in the first exemplary embodiment in which the processes of steps S530 and S540 are not executed. After executing the process of step S520, the control unit 321 executes the process of step S550 next. As described above, in a case where an operation satisfying the synchronization start condition occurs in the multifunction peripheral 120 according to the present exemplary embodiment, the multifunction peripheral 120 always transmits to the server 110 a synchronization request requesting keep-alive communication.

Figure 9:
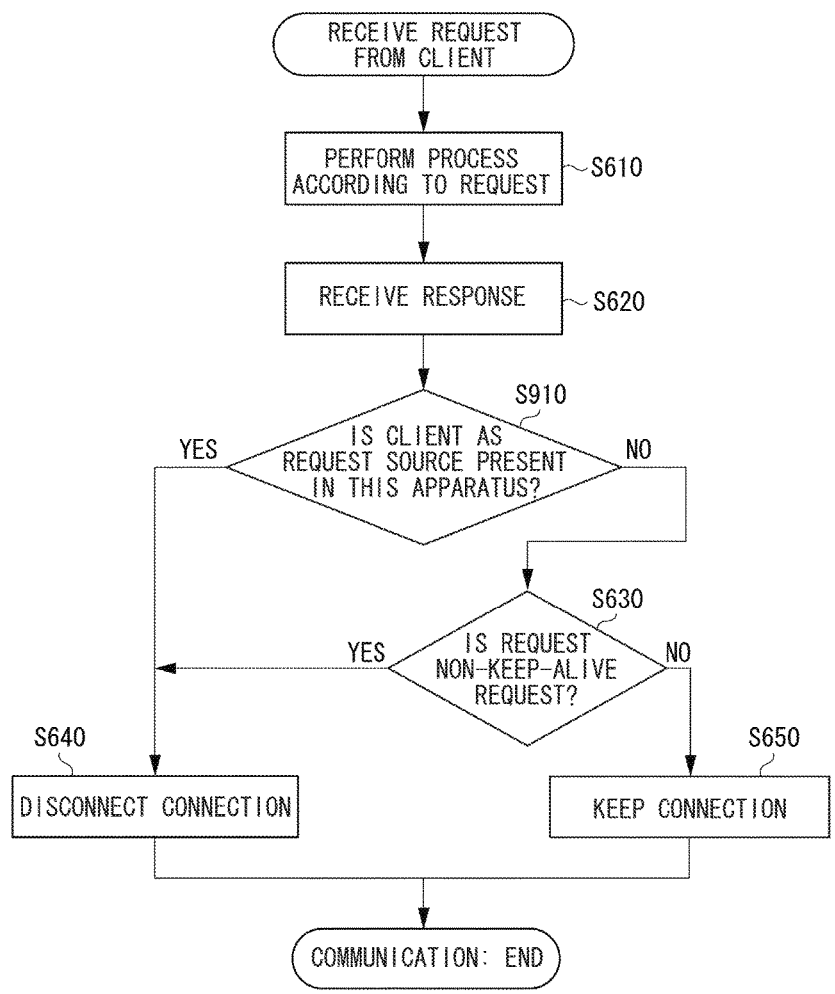
FIG. 9 is a flowchart illustrating processing performed by a server application according to the third exemplary embodiment.

Next, with reference to FIG. 9, a description is given of the procedure of a communication process performed by the server application 400 of the server 110 according to the present exemplary embodiment. The processing illustrated in FIG. 9 is achieved by the CPU 202 executing the server application 400 read from the HDD 205 or the ROM 206. The processing in FIG. 9 is started when the server application 400 receives a synchronization request from the client application 300. In the following description, processes similar to those described with reference to FIG. 6 in the first exemplary embodiment are designated by the same step numbers as those in FIG. 6.

After the server application 400 transmits the response to the synchronization request acquired from the client application 300 in step S620, the server application 400 executes the process of step S910.

In step S910, the control unit 421 determines whether the client application 300 as the request source of the synchronization request is a client application 300 operating on the multifunction peripheral 120 on which the control unit 421 is operating. That is, in step S910, the control unit 421 determines whether the control unit 421 receives the synchronization request from the multifunction peripheral 120 as a client configured as an apparatus integrated with the server 110.

This determination can be made by, for example, comparing the value of a "Host" header field included in the synchronization request with IP address information of the multifunction peripheral 120 set in advance. If the value of the "Host" header field and the IP address information match each other, the control unit 421 determines that the client application 300 as the request source of the synchronization request is a client application 300 operating on the multifunction peripheral 120 on which the control unit 421 is operating. If, on the other hand, the value of the "Host" header field and the IP address information are different from each other, the control unit 421 determines that the client application 300 as the request source of the synchronization request is a client application 300 operating on another apparatus. The determination method is not limited to this and is not particularly limited.

If, as a result of the determination, the client application 300 as the request source of the synchronization request is executed by the multifunction peripheral 120 on which the control unit 421 is operating (YES in step S910), the processing proceeds to step S640. If, on the other hand, the client application 300 as the request source of the synchronization request is executed by another apparatus (NO in step S910), the processing proceeds to step S630.

For example, if the synchronization request is received from the client application 300 of the multifunction peripheral 120a on which the server 110 is operating, the determination is YES in step S910, and the control unit 421 executes the process of step S640. If, on the other hand, the synchronization request is received from the client application 300 of the multifunction peripheral 120b or 120c, which is an apparatus different from that of the server 110, the determination is NO in step S910, and the control unit 421 executes the process of step S630. The other processes are similar to those in the first exemplary embodiment and therefore are not described here.

As described above, if it is determined that the multifunction peripheral 120 is an apparatus configured with the server 110 in an integrated manner, the server 110 releases the connection established with the multifunction peripheral 120.

In the present exemplary embodiment, even if a request for keep-alive communication is received from the client application 300, the server 110 releases the connection if the request is from a client application 300 operating on the multifunction peripheral 120 on which the server 110 is operating. According to the present exemplary embodiment, the server 110 can disconnect connections with all the multifunction peripherals 120 managed by the server 110. Thus, the server 110 becomes able to transition to a power saving state. Consequently, the multifunction peripheral 120a configured as an apparatus integrated with the server 110 can transition to a power saving state.

In a fourth exemplary embodiment, an example is described where even if the server 110 keeps a connection with the multifunction peripheral 120, the server 110 is allowed to transition to a power saving state in a predetermined case. That is, if an application with which a connection is being kept is only a client application 300 operating on the multifunction peripheral 120 on which the server 110 is operating, the server 110 is allowed to transition to a power saving state.

In the configuration according to the present exemplary embodiment, portions similar to those of the first exemplary embodiment are not described, and only portions different from those of the first exemplary embodiment are described here.

In the present exemplary embodiment, according to the management state of a connection established by the communication processing unit 422, the control unit 421 of the server application 400 determines whether the multifunction peripheral 120 is able to transition to a power saving state.

Further, in the present exemplary embodiment, in a case where a predetermined condition is satisfied in the multifunction peripheral 120, the control unit 321 of the client application 300 executes the process of inquiring of the server application 400 about whether the multifunction peripheral 120 can transition to a power saving state.

Figure 10:
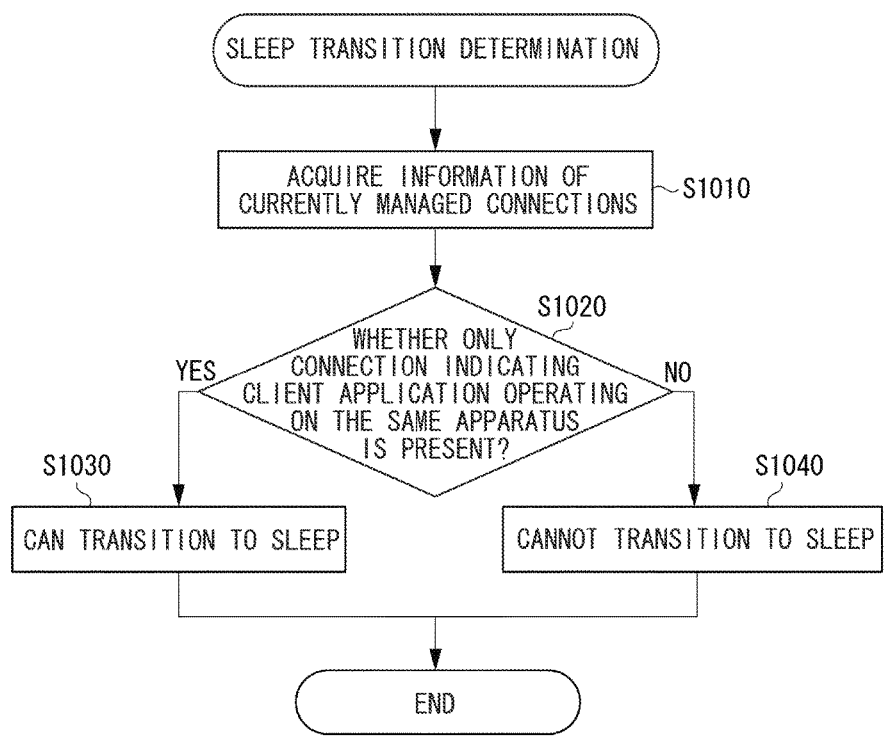
FIG. 10 is a flowchart illustrating processing performed by a server application according to a fourth exemplary embodiment.

With reference to FIG. 10, a description is given of the processing executed by the server application 400 according to the present exemplary embodiment. The processing in FIG. 10 is started in a case where the server application 400 receives from the client application 300 an inquiry about whether the multifunction peripheral 120 can transition to a power saving state. The processing illustrated in FIG. 10 is achieved by the CPU 202 executing the server application 400 read from the HDD 205 or the ROM 206.

First, in step S1010, the control unit 421 acquires information of connections currently managed by the control unit 421. The information of the connections is, for example, information including at least socket information, which is a set of an IP address and a port number, and state information indicating maintenance or release. When a connection with the client application 300 is established, information of the communication connection is held in the RAM 203 or the HDD 205.

In step S1020, based on information of kept connections, the control unit 421 determines whether only a connection indicating a client application 300 operating on the same apparatus is present.

In a case where, as a result of the determination, only a connection indicating a client application 300 operating on the same apparatus is present (YES in step S1020), the processing proceeds to step S1030. In step S1030, the control unit 421 holds information indicating that the multifunction peripheral 120 can transition to a power saving state. Then, this flow ends.

In a case where, on the other hand, a connection indicating a client application 300 other than that operating on the same apparatus is present (NO in step 31020), the processing proceeds to S1040. In step S1040, the control unit 421 holds information indicating that the multifunction peripheral 120 cannot transition to a power saving state. Then, this flow ends.

If the control unit 421 holds information indicating that the multifunction peripheral 120 can transition to a power saving state, and if any other transition condition is satisfied, the multifunction peripheral 120 transitions to a power saving state. As described above, if it is determined that the multifunction peripheral 120 is an apparatus configured with the server 110 in an integrated manner, and if the server 110 establishes a communication connection with only the multifunction peripheral 120 as a client, a determination is made as follows. That is, it is determined that the server 110 and the multifunction peripheral 120 configured as the same apparatus can transition to a power saving state.

According to the present exemplary embodiment, even in a case where a connection that is being kept by the server 110 is present, but in a case where the connection is only a connection with a client application 300 executed by the multifunction peripheral 120 on which the server 110 is operating, it is possible to control the multifunction peripheral 120 to transition to a power saving state.

In the first exemplary embodiment, in a case where the server application 400 is enabled on the same apparatus as the multifunction peripheral 120 executing the client application 300, the client application 300 requests non-keep-alive synchronization communication.

In contrast, in a fifth exemplary embodiment, even if the server application 400 is enabled on the same apparatus as the multifunction peripheral 120, but in a case where it is necessary to successively execute communication regarding a plurality of synchronization requests, keep-alive synchronization communication is requested within the execution period of the plurality of synchronization requests. It is therefore possible to quickly execute a synchronization process. In the present exemplary embodiment, a set of the plurality of synchronization requests to be successively executed is referred to as a "synchronization job".

In the configuration according to the present exemplary embodiment, portions similar to those of the first exemplary embodiment are not described, and only portions different from those of the first exemplary embodiment are described here.

Figure 11:
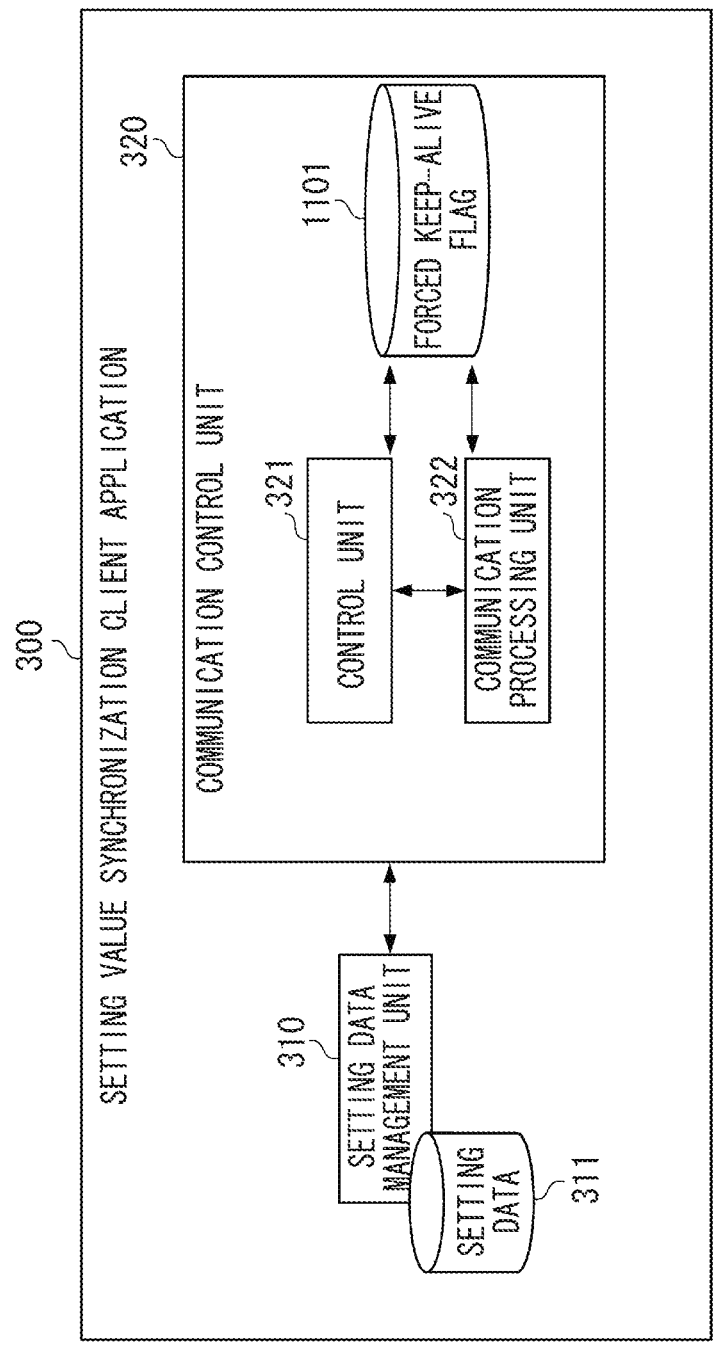
FIG. 11 is a diagram illustrating a module configuration of a client application according to a fifth exemplary embodiment.

With reference to FIG. 11, the software configuration of the client application 300 according to the present exemplary embodiment is described. In the present exemplary embodiment, the communication control unit 320 has a forced keep-alive flag 1101. The forced keep-alive flag 1101 is set by the control unit 321 according to the content of a synchronization request to be transmitted from the control unit 321 to the server application 400 via the communication processing unit 322 and is referenced by the communication processing unit 322 when communication is executed. According to the value of the referenced forced keep-alive flag 1101, the communication processing unit 322 switches whether to transmit a keep-alive synchronization request or a non-keep-alive synchronization request to the server application 400. The forced keep-alive flag 1101 is stored in any of the HDD 205, the ROM 206, and the RAM 203.

Figure 12:
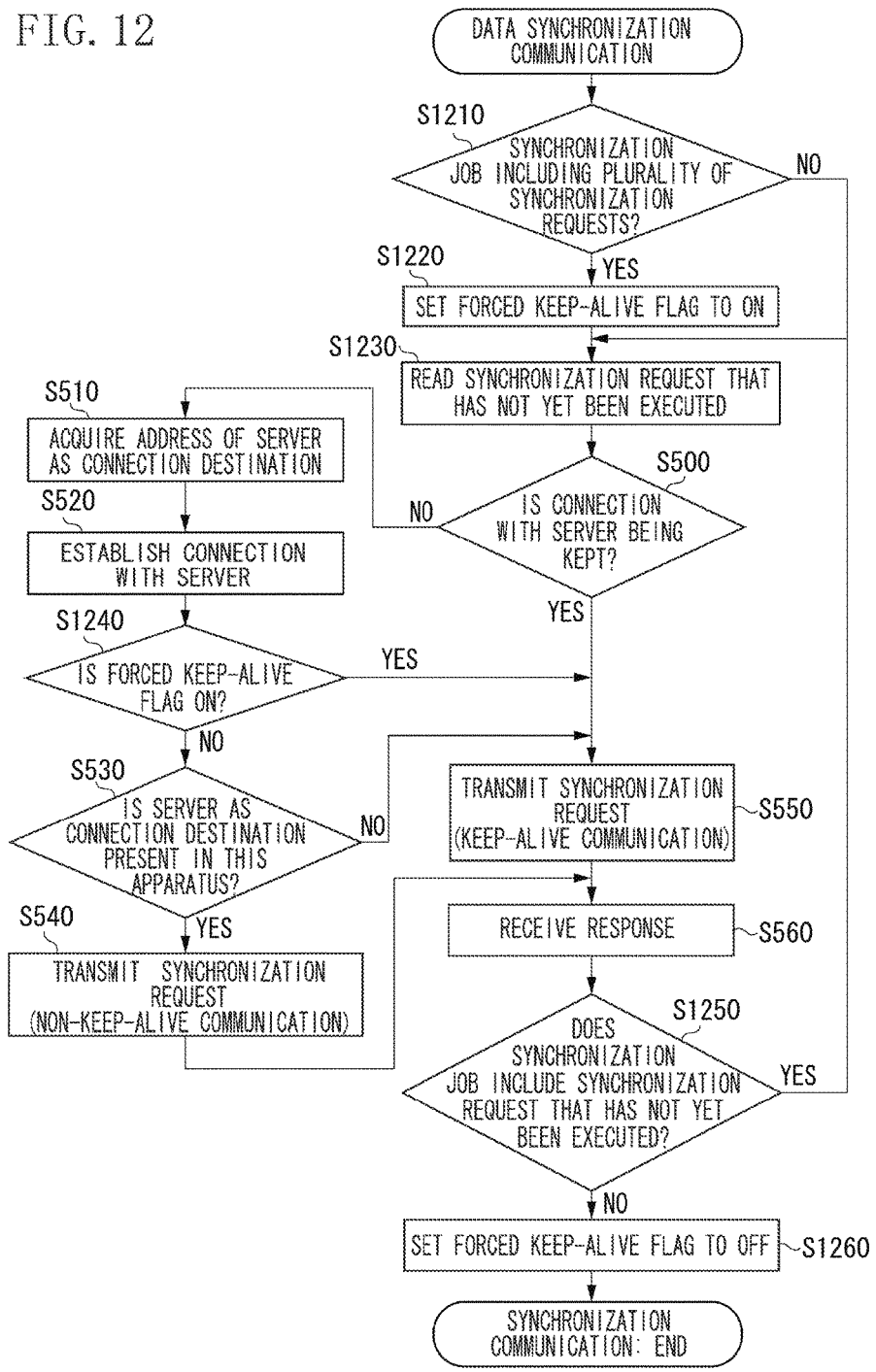
FIG. 12 is a flowchart illustrating processing performed by the client application according to the fifth exemplary embodiment.

With reference to FIG. 12, the operation of the client application 300 according to the present exemplary embodiment is described. The processing illustrated in FIG. 12 is achieved by the CPU 202 executing the client application 300 read from the HDD 205 or the ROM 206. The processes described with reference to FIG. 5 in the first exemplary embodiment are designated by the same step numbers as those in FIG. 5 and are not described here.

The flowchart in FIG. 12 is started in a case where a predetermined synchronization job start condition is satisfied. Examples of the predetermined synchronization job start condition include a case where the multifunction peripheral 120 synchronizes the master data 401 held in the server 110 with the setting data 311 for the first time, and a case where the multifunction peripheral 120 forcibly synchronizes the setting data 311 with the master data 401 according to an instruction from the user. In these cases, to synchronize the setting data 311 with the master data 401, synchronization requests for a plurality of pieces of data included in the master data 401 are successively executed. Thus, in these cases, the control unit 321 executes synchronization communication with the server application 400 via the communication processing unit 322 by collectively treating the plurality of synchronization requests as a single synchronization job. The predetermined synchronization job start condition, however, does not need to be any of these examples, and the content of the condition does not matter.

In step S1210, the control unit 321 determines whether synchronization communication to be executed is a synchronization job started based on the synchronization job start condition as described above. In a case where, as a result of the determination, the synchronization communication to be executed is a synchronization job started based on the synchronization job start condition (YES in step S1210), the processing proceeds to step S1220. If not (NO in step S1210), the processing proceeds to step S1230. In step S1220, the control unit 321 sets the forced keep-alive flag 1101 to on, and the processing proceeds to step S1230. In step S1230, the control unit 321 reads a single synchronization request that is included in the synchronization job and has not yet been executed, and the processing proceeds to step 3500. If the determination is NO in step S500, then in step S1240, the communication processing unit 322 acquires the value of the forced keep-alive flag 1101 and determines whether the flag is on. If the flag is on (YES in step S1240), the processing proceeds to step S550. In step S550, the communication processing unit 322 transmits the synchronization request including a keep-alive communication request to the server application 400 and notifies the control unit 321 of this transmission. Then, the processing proceeds to step S1250. In step S1250, the control unit 321 determines whether the synchronization job includes a synchronization request that has not yet been executed. In a case where, as a result of the determination, a synchronization request that has not yet been executed is included (YES in step S1250), the processing proceeds to step S1230. In a case where a synchronization request that has not yet been executed is not included (NO in step S1250), the processing proceeds to step S1260. In step S1260, the control unit 321 determines that the synchronization job is completed. Then, the control unit 321 sets the forced keep-alive flag 1101 to off, and this flow ends.

According to the present exemplary embodiment, even in a case where the multifunction peripheral 120 as a client and the server 110 are configured as an integrated apparatus, and a synchronization process involving a plurality of successive communications is executed, it is possible to quickly execute the process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-072593, filed Mar. 31, 2016 and No. 2017-010751, filed Jan. 24, 2017 which are hereby incorporated by reference herein in their entirety.

What is claimed is:

1. An information processing apparatus comprising:
a memory device that stores a set of instructions; and
at least one processor that executes the instructions to:
determine whether or not the information processing apparatus is an apparatus which requires, as a transition condition of the apparatus to a power saving state, that a server becomes able to transition to the power saving state, the server being for communicating with the information processing apparatus; and
regarding keeping of a communication connection between the information processing apparatus and the server, perform different types of control between a case where it is determined that the information processing apparatus is the apparatus which requires, as the transition condition to the power saving state, that the server becomes able to transition to the power saving state, and a case where it is determined that the information processing apparatus is not the apparatus which requires, as the transition condition to the power saving state, that the server becomes able to transition to the power saving state.

2. The information processing apparatus according to claim 1, wherein the at least one processor executes instructions stored in the memory device to:
execute a process of establishing a communication connection between the server and the information processing apparatus;
in a case where the server and the information processing apparatus are different apparatuses, then determine that the information processing apparatus is not the apparatus which requires, as the transition condition to the power saving state, that the server becomes able to transition to the power saving state; and
according to a determination that the server and the information processing apparatus are different apparatuses, perform control to cause the information processing apparatus to notify the server of information for causing the server to keep the established communication connection.

3. The information processing apparatus according to claim 1, wherein the at least one processor executes instructions stored in the memory device to:
execute a process of establishing a communication connection between the server and the information processing apparatus;
in a case where the information processing apparatus is an apparatus configured with the server in an integrated manner, then determine that the information processing apparatus is the apparatus which requires, as the transition condition to the power saving state, that the server becomes able to transition to the power saving state; and
according to a determination that the information processing apparatus is an apparatus configured with the server in an integrated manner, perform control to cause the information processing apparatus as a client of the server to notify the server of information for causing the server to release the established communication connection.

4. The information processing apparatus according to claim 1, wherein the at least one processor executes instructions stored in the memory device to:
execute a process of establishing a communication connection between the server and the information processing apparatus;
in a case where the information processing apparatus is an apparatus configured with the server in an integrated manner, then determine that the information processing apparatus is the apparatus which requires, as the transition condition to the power saving state, that the server becomes able to transition to the power saving state; and
in a case where the information processing apparatus is an apparatus configured with the server in an integrated manner, perform control to release the established communication connection.

5. The information processing apparatus according to claim 1, wherein the at least one processor executes instructions stored in the memory device to:
in a case where it is determined that the information processing apparatus is an apparatus configured with the server in an integrated manner, and in a case where the server establishes a communication connection with only the information processing apparatus as a client, determine that the information processing apparatus can transition to the power saving state.

6. An information processing apparatus comprising:
a memory device that stores a set of instructions; and at least one processor that executes the instructions to:
execute a process of establishing a communication connection with a server;
determine whether or not the information processing apparatus is an apparatus which requires, as a transition condition of the apparatus to a power saving state, that a server becomes able to transition to the power saving state, the server being for communicating with the information processing apparatus; and
according to a result of the determination, notify the server of information for causing the server to keep the established communication connection or information for causing the server to release the established communication connection.

7. The information processing apparatus according to claim 6, wherein the at least one processor executes instructions stored in the memory device to:
in a case where the server and the information processing apparatus are different apparatuses, then determine that the information processing apparatus is not the apparatus which requires, as the transition condition to the power saving state, that the server becomes able to transition to the power saving state; and
according to a determination that the server is an apparatus different from the information processing apparatus, notify the server of information for causing the server to keep the established communication connection.

8. The information processing apparatus according to claim 6, wherein the at least one processor executes instructions stored in the memory device to:
in a case where the information processing apparatus is an apparatus configured with the server in an integrated manner, then determine that the information processing apparatus is the apparatus which requires, as the transition condition to the power saving state, that the server becomes able to transition to the power saving state; and
according to a determination that the information processing apparatus is an apparatus configured with the server in an integrated manner, notify the server of information for causing the server to release the established communication connection.

9. The information processing apparatus according to claim 6, wherein the at least one processor executes instructions stored in the memory device to:
manage setting information of the information processing apparatus; and
establish a connection with the server to execute at least either a notification process for notifying the server of first update information indicating a content of an update of the managed setting information, or an acquisition process for acquiring, from the server, second update information indicating a content of an update of setting information managed by the server.

10. The information processing apparatus according to claim 9, wherein the at least one processor executes instructions stored in the memory device to:
execute the notification process for notifying the server of the first update information;
execute the acquisition process for acquiring the second update information from the server;
in a case where the information processing apparatus is an apparatus configured with the server in an integrated manner, then determine that the information processing apparatus is the apparatus which requires, as the transition condition to the power saving state, that the server becomes able to transition to the power saving state;
in a case where a process to be executed is the notification process and it is determined that the information processing apparatus is an apparatus configured with the server in an integrated manner, notify the server of information for causing the server to keep the established communication connection; and
in a case where a process to be executed is the acquisition process and it is determined that the information processing apparatus is an apparatus configured with the server in an integrated manner, notify the server of information for causing the server to release the established communication connection.

11. The information processing apparatus according to claim 9, wherein the at least one processor executes instructions stored in the memory device to:
notify the server of, together with a request to acquire the second update information or together with the first update information, the information for causing the server to keep the communication connection.

12. The information processing apparatus according to claim 9, wherein the at least one processor executes instructions stored in the memory device to:
notify the server of, together with a request to acquire the second update information or together with the first update information, the information for causing the server to release the communication connection.

13. The information processing apparatus according to claim 9, further comprising
a storage unit configured to store an address of the server for communicating with the information processing apparatus,
wherein the at least one processor executes instructions stored in the memory device to:
in a case where the address of the server stored in the storage unit is a predetermined address, then determine that the information processing apparatus is the apparatus which requires, as the transition condition of the apparatus to the power saving state, that the server becomes able to transition to the power saving state; and
in a case where the address of the server stored in the storage unit is not the predetermined address, then determine that the information processing apparatus is not the apparatus which requires, as the transition condition of the apparatus to the power saving state, that the server becomes able to transition to the power saving state.

14. The information processing apparatus according to claim 6, wherein the server is a server for, under a condition that a communication connection between the server and another information processing apparatus is not established, determining that the information processing apparatus can transition to a power saving state.

15. A method for controlling an information processing apparatus, the method comprising:
determining whether or not the information processing apparatus is an apparatus which requires, as a transition condition of the apparatus to a power saving state, that a server becomes able to transition to the power saving state, the server being for communicating with the information processing apparatus; and
regarding keeping of a communication connection between the information processing apparatus and the server, performing different types of control between a case where it is determined that the information processing apparatus is the apparatus which requires, as the transition condition to the power saving state, that the server becomes able to transition to a power saving state, and a case where it is determined that the information processing apparatus is not the apparatus which requires, as the transition condition to the power saving state, that the server becomes able to transition to a power saving state.

16. A method for controlling an information processing apparatus, the method comprising:
    executing a process of establishing a communication connection with a server;
    determining whether or not the information processing apparatus is an apparatus which requires, as a transition condition of the apparatus to a power saving state, that a server becomes able to transition to the power saving state, the server being for communicating with the information processing apparatus; and
    according to a result of the determination, notifying the server of information for causing the server to keep the established communication connection or information for causing the server to release the established communication connection.

17. A non-transitory computer readable storage medium having stored therein a program for causing an information processing apparatus to execute:
    determining whether or not the information processing apparatus is an apparatus which requires, as a transition condition of the apparatus to a power saving state, that a server becomes able to transition to the power saving state, the server being for communicating with the information processing apparatus; and
    regarding keeping of a communication connection between the information processing apparatus and the server, performing different types of control between a case where it is determined that the information processing apparatus is the apparatus which requires, as the transition condition to the power saving state, that the server becomes able to transition to the power saving state, and a case where it is determined that the information processing apparatus is not the apparatus which requires, as the transition condition to the power saving state, that the server becomes able to transition to the power saving state, to a power saving state.

18. A non-transitory computer readable storage medium having stored therein a program for causing an information processing apparatus to execute:
    executing a process of establishing a communication connection with a server;
    determining whether the information processing apparatus is an apparatus which requires, as a transition condition of the apparatus to a power saving state, that a server becomes able to transition to the power saving state, the server being for communicating with the information processing apparatus; and
    according to a result of the determination, notifying the server of information for causing the server to keep the established communication connection or information for causing the server to release the established communication connection.

* * * * *